(12) United States Patent
Barker et al.

(10) Patent No.: US 12,358,822 B2
(45) Date of Patent: Jul. 15, 2025

(54) FERRATE BASED WATER TREATMENT

(71) Applicant: CECO ENVIRONMENTAL IP INC., Dallas, TX (US)

(72) Inventors: David Barker, Dubai (AE); Sammy Aquino, Dubai (AE)

(73) Assignee: CECO ENVIRONMENTAL IP INC., Dallas, TX (US)

( * ) Notice: Subject to any disclaimer, the term of this patent is extended or adjusted under 35 U.S.C. 154(b) by 0 days.

(21) Appl. No.: 18/732,310

(22) Filed: Jun. 3, 2024

(65) Prior Publication Data

US 2024/0317623 A1    Sep. 26, 2024

Related U.S. Application Data

(62) Division of application No. 17/145,652, filed on Jan. 11, 2021, now Pat. No. 11,999,644.

(51) Int. Cl.
| | | |
|---|---|---|
| C02F 9/00 | (2023.01) | |
| C02F 1/00 | (2023.01) | |
| C02F 1/28 | (2023.01) | |
| C02F 1/52 | (2023.01) | |
| C02F 1/70 | (2023.01) | |
| C02F 1/72 | (2023.01) | |
| C02F 11/143 | (2019.01) | |

(52) U.S. Cl.
CPC .............. *C02F 9/00* (2013.01); *C02F 1/001* (2013.01); *C02F 2001/007* (2013.01); *C02F 1/281* (2013.01); *C02F 1/5236* (2013.01); *C02F 1/705* (2013.01); *C02F 1/72* (2013.01); *C02F 11/143* (2019.01); *C02F 2209/105* (2013.01)

(58) Field of Classification Search
None
See application file for complete search history.

(56) References Cited

U.S. PATENT DOCUMENTS

| | | |
|---|---|---|
| 2013/0270189 A1 | 10/2013 | Allen |
| 2014/0001109 A1 | 1/2014 | Lee |
| 2015/0197439 A1 | 7/2015 | Zou |
| 2018/0050938 A1 | 2/2018 | Duta |
| 2020/0270145 A1 | 8/2020 | Luke |
| 2022/0220017 A1 | 7/2022 | Barker |

FOREIGN PATENT DOCUMENTS

| | | |
|---|---|---|
| CN | 108238689 A | 7/2018 |
| WO | 2022150577 A1 | 7/2022 |

OTHER PUBLICATIONS

International Search Report and Written Opinion, dated Apr. 11, 2022, PCT/US2022/011596, filed on Jan. 7, 2022.
International Preliminary Report on Patentability, dated Jul. 20, 2023, PCT/US2022/011596, filed on Jan. 7, 2022.
Restriction Requirement dated Jan. 17, 2023, U.S. Appl. No. 17/145,652, filed Jan. 11, 2021.

(Continued)

*Primary Examiner* — Peter Keyworth
(74) *Attorney, Agent, or Firm* — Andrew M. Metrailer; Michael W. Piper; Conley Rose, P.C.

(57) ABSTRACT

System and process for the treatment of water using a ferrate-based reduction-oxidation (redox) reactor, a clarifier, and a two-stage filtration system. Three treatment substrates can be used to treat water in the water treatment system and process, namely, a ferric compound(s), an acidic oxidant, and a flocculant-adsorbent.

6 Claims, 5 Drawing Sheets

(56) References Cited

OTHER PUBLICATIONS

Office Action dated Mar. 22, 2023, U.S. Appl. No. 17/145,652, filed Jan. 11, 2021.
Final Office Action dated Oct. 23, 2023, U.S. Appl. No. 17/145,652, filed Jan. 11, 2021.
Notice of Allowance dated Jan. 31, 2024, U.S. Appl. No. 17/145,652, filed Jan. 11, 2021.

FERRATE BASED WATER TREATMENT

CROSS-REFERENCE TO RELATED APPLICATIONS

This application is a divisional of and claims priority under 35 U.S.C. § 120 to U.S. patent application Ser. No. 17/145,652 filed on Jan. 11, 2021, entitled "FERRATE BASED WATER TREATMENT," by David BARKER, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to a continuous process and system for treatment of water using ferrate.

BACKGROUND

Advanced oxidation processes (AOPs) are chemical-based water treatment procedures designed to remove organic and some inorganic material from water and wastewater by oxidation reactions. Common AOP technologies for waste water treatment include usage of ozone ($O_3$) with hydrogen peroxide ($H_2O_2$) or ultraviolent (UV) light, hydrogen peroxide ($H_2O_2$) with ultraviolent (UV) light, chlorine-containing compounds (sodium hypochlorite (NaClO), also known as bleach), or ferrous-based systems using iron ions (e.g., $Fe^{2+}$, $Fe^{3+}$) in a solution of hydrogen peroxide ($H_2O_2$).

Chemical-based AOP technologies for commercial scale wastewater treatment involve handling the chemicals in large volumes which are hazardous and even poisonous to humans, animals, and/or the environment. Additionally, the treatment cost and logistics requirement for common AOP technologies are challenging due to high quantity necessary to produce hydroxide radicals and oxidizing reagents when there's a high contaminant loading. As a result, synthesizing and supplying chemical reagents for the oxidation process, on a continuous basis, is not feasible in many situations.

SUMMARY

A process for treatment of a contaminated water stream, comprising: contacting the contaminated water with ferrate in a redox reactor to produce a redox water; removing particulate contaminants from the redox water in a clarifier to produce a clarified water; and filtering at least a portion of the clarified water in a two-stage filtration system to produce a treated water, wherein each step of the process is performed on a continuous basis.

A ferrate-based water treatment system comprising: a ferric compound solution preparation system configured to prepare ferric compound solution; an acidic oxidant solution preparation system configured to prepare an acidic oxidant solution; a flocculant-adsorbent solution preparation system configured to prepare a flocculant-adsorbent solution; a redox reactor fluidly coupled to the ferric compound solution preparation system and to the acidic oxidant solution preparation system and to the flocculant-adsorbent solution preparation system; a clarifier fluidly coupled to the redox reactor, to the ferric compound solution preparation system, and to the acidic oxidant solution preparation system; and a two-stage filtration system coupled to the clarifier.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
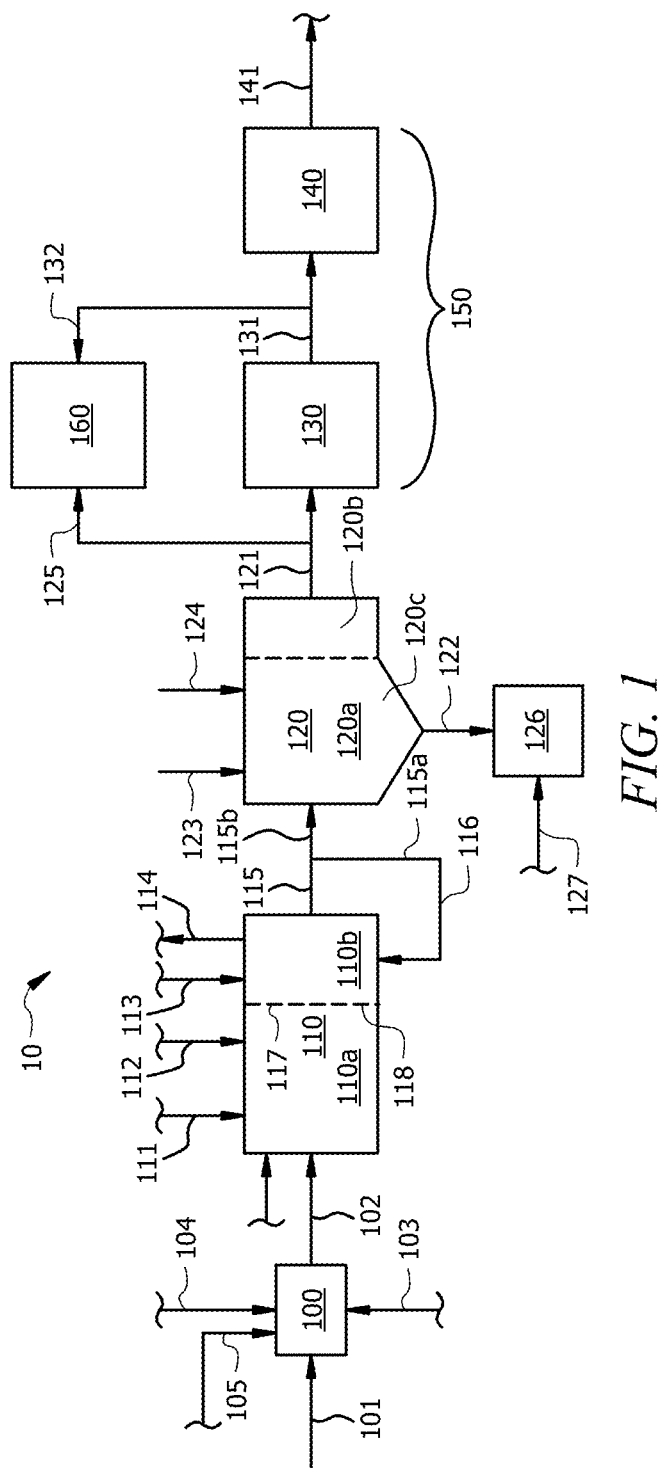
FIG. 1 illustrates a process flow diagram of the continuous water treatment process and system disclosed herein.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," "in some embodiments," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "stream" as used herein can refer to the fluid described herein and/or the physical piping and/or conduit through which the fluids discussed herein flow. "Stream" can be used interchangeably with "pipe", "piping", and "conduit" in some instances.

Embodiments of the process and system are described with reference to equipment and process functionality. The process may be described using the system components and equipment, and it is to be understood that embodiments of the system can include any combination of the components and equipment disclosed herein and having functionality described herein to perform the process.

The system and process disclosed herein involve the treatment of water using a ferrate-based reduction-oxidation (redox) reactor, a clarifier, and a two-stage filtration system. Three treatment substrates can be used to treat water in the water treatment system, namely, a ferric compound(s), an acidic oxidant, and a flocculant-adsorbent. Contact of the ferric compound(s) (e.g., containing iron as $Fe^{3+}$) with acidic oxidant can form ferrate that has a high redox potential, functions to remove contaminants by oxidation and by disinfection, and is safer to humans and the environment (e.g., compared with the production of disinfection byproducts (e.g., trihalomethane and haloacetic acid) using chlorine-based technology or other hazardous or carcinogenic chemicals using ozone) for the treatment of contaminated water. The ferrate used in the disclosed process and system also produces ferric hydroxide in the form of $Fe^{3+}$, which is non-toxic and benign to the environment, while functioning as a coagulant.

FIG. 1 illustrates a process flow diagram of the continuous water treatment process and system 10 disclosed herein. The process and system can continuously produce a treated water in stream 141 from a continuously fed contaminated water in stream 102, and can includes steps for ferrate-based reduction and oxidation reactions in redox reactor 110, gravity separation or sedimentation in clarifier 120, and/or mechanical filtration with catalytic precipitation, chemisorption and adsorption in a two-stage filtration system 150 that includes a first stage containing one or more zeolite-based advanced catalytic media (ACM) filter(s) 130 and a second stage containing one or more catalytic carbon (CC) filter(s) 140, where the effluent of the first stage can be received by the second stage. The process and system 10 optionally include one or more of pre-treatment of raw source water received from stream 101 in pre-treatment system 100 to produce the contaminated water in stream 102, sludge treatment in a sludge handling system 126, and collection and treatment of dirty water in dirty backwash water sump 160 (e.g., when backwashing any of the filter(s) 130 and 140).

In more detail for the process and system 10, contaminated water stream 102 (optionally received from pre-treatment system 100) can be fed to redox reactor 110, along with a stream 111 of a ferric compound solution, a stream 112 of an acidic oxidant solution, and a stream 113 of a flocculant-adsorbent solution. The redox reactor 110 can be embodied as a vessel having one or more inlets and one or more outlets for the flow of components into and out of the vessel, as described herein; also, the redox reactor 110 can be embodied as two or more identical vessels each being fluidly connected to the streams 102, 111, 112, 113, 114, and 115. The ferric compounds can react with the acidic oxidant to form ferrate in the redox reactor 110, and the ferrate can react with contaminants in the contaminated water to produce particulates that agglomerate and coagulate due to the flocculant-adsorbent. The reaction mixture in the redox reactor 110 can be kept under an inert gas blanket (e.g., nitrogen blanket), and gases can be vented from the redox reactor 110 in vent gas stream 114. The redox water can flow from the redox reactor 110 in stream 115. In optional embodiments, a portion 115a of the redox water in stream 115 can be recycled to the redox reactor 110 in recycle stream 116, and the remaining portion 115b of the redox water in stream 115 can flow to the clarifier 120.

The redox water in stream 115 can be fed to a clarifier 120. In optional embodiments, a stream 123 of the ferric compound solution and a stream 124 of the acidic oxidant solution can be fed to the clarifier 120. The clarifier 120 can be embodied as a vessel having one or more inlets and one or more outlets for the flow of components into and out of the vessel, as described herein; also, the clarifier 120 can be embodied as two or more identical vessels each being fluidly connected to streams 115, 121, and 122 and optional streams 123 and 124, and in parallel with one another. Clarified water can exit the clarifier 120 in stream 121, and sludge can exit the clarifier in stream 122.

In the clarifier 120, solid particulates produced from the reaction of ferrate and the contaminants can settle to the bottom of the vessel, creating a layer of sludge. The sludge can be removed by any technique known in the art with the aid of this disclosure so as to flow in stream 122 to a sludge handling system 126. Stream 127, which contains a flocculant-adsorbent solution, can be connected to a sludge thickening vessel in the sludge handling system 126 and can be configured to dose the sludge with the flocculant-adsorbent solution so as to thicken the sludge. The sludge handling system 126 produces a "safe sludge" and is described in more detail below.

The clarified water in stream 121 can be fed to the first stage of the two-stage filtration system 150. The first stage can be an advanced catalytic media filtration in one or more ACM filters 130 that are configured to produce a filtered water stream 131 containing filtered water. The filtered water stream 131 can then be fed to the second stage of two-stage filtration system 150. The second stage can be a catalytic carbon filtration in one or more CC filters 140 that are configured to produce the treated water stream 141. In embodiments, the treated water stream 141 can have a composition of water having less than 2 mg/L ammoniacal nitrogen, less than 2 mg/L iron, less than 0.1 mg/L phenol, less than 20 mg/L of organisms that have a biological oxygen demand, less than 100 mg/L of compounds that have a chemical oxygen demand, less than 0.1 mg/L $H_2S$, less than 0.1 mg/L sulfur-containing compounds (other than $H_2S$), less than 0.05 mg/L cyanide, 0 CFU/mL sulfate reducing bacteria, less than 75 mg/L of total organic carbon, and/or less than 0.01 mg/L heavy metal (e.g., Zinc, Arsenic, Aluminum, Copper, Cadmium, Manganese, or a combination thereof).

In some embodiments, a dirty backwash water sump 160 can be included to collect dirty water from the ACM filter 130 and/or the CC filter 140, for example, during backwashing the ACM filter 130 or CC filter 140. Stream 125 can be connected to the dirty backwash water sump 160 and to the clarified water stream 121 at a location that is upstream of the ACM filter 130. Stream 132 can be connected to the dirty backwash water sump 160 and to the first filtered water stream 131 at a location that is upstream of the CC filter 140.

In some embodiments, raw source water received from stream 101 can be pre-treated in pre-treatment system 100 to produce the contaminated water in stream 102. The pre-treatment can include feeding/dosing the ferric compound solution to the pre-treatment system 100 via stream 103, feeing the acidic oxidant solution to the pre-treatment system 100 via stream 104, and feeding the flocculant-adsorbent solution to the pre-treatment system 100 via in stream 105.

Water Pre-Treatment

Figure 2A:
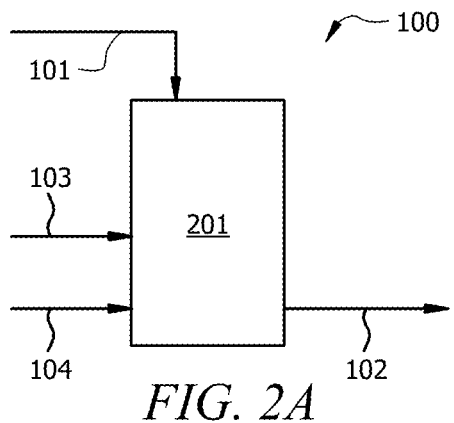
FIGS. 2A and 2B illustrate process flow diagrams of embodiments of the pre-treatment system of FIG. 1.
Figure 2B:
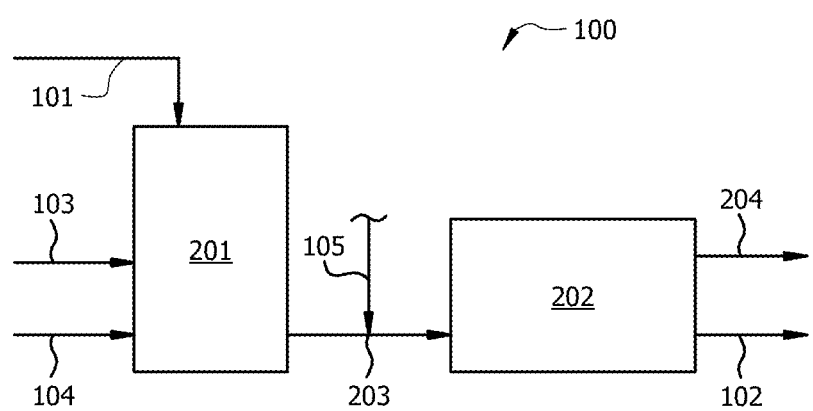

FIGS. 2A and 2B illustrate process flow diagrams of embodiments of the pre-treatment system 100 of FIG. 1. FIG. 2A illustrates the pre-treatment system 100 embodied as a buffer tank 201. The buffer tank 201 can be configured to have a volume that accommodates for surges and dips in the flow of raw source water in stream 101 from the various sources (e.g., produced water from oil and gas recovery, water recovered from chemical processes, etc.), which may or may not provide a constant supply of contaminated water. Thus, the buffer tank 201 can be important for operation of the continuous process and system 10, in that, the buffer tank 201 helps provide a continuous flow of contaminated water via stream 102 to the redox reactor 110 so that subsequent treatment steps in the process and system 10 can operate on a continuous flow basis.

In some embodiments of the pre-treatment system 100 of FIG. 2A, a ferric compound solution can be fed/dosed to the buffer tank 201 via stream 103, and an acidic oxidant solution can be fed to the buffer tank 201 via stream 104. As will be described in more detail below, stream 103 can be generated by the ferric compound solution preparation system 300, and stream 104 can be generated by the acidic oxidant preparation system 310.

FIG. 2B illustrates the pre-treatment system 100 embodied as the buffer tank 201 followed by a combined corrugated plate interceptor plus dissolved nitrogen flotation unit (CPI+DNF unit) 202. Source water can flow from the buffer tank 201 to the CPI+DNF unit 202 via stream 203. In some aspects, stream 203 can include a plug flow flocculator. In the CPI+DNF unit 202, contaminants such as oil can be removed from the raw source water by flotation, and the floating contaminants can be removed from the CPI+DNF unit 202 via stream 204, while the contaminated water is removed from the CPI+DNF unit 202 by stream 102. The pre-treated water in stream 102 can then flow from the pre-treatment system 100 to the redox reactor 110.

In some embodiments of the pre-treatment system 100 of FIG. 2B, a ferric compound solution can be fed/dosed to the buffer tank 201 via stream 103, and an acidic oxidant solution can be fed to the buffer tank 201 via stream 104. Similar to the description above, stream 103 is generated by the ferric compound solution preparation system 300, and stream 104 is generated by the acidic oxidant preparation system 310.

Feed Components Preparation and Dosing

Figure 3C:
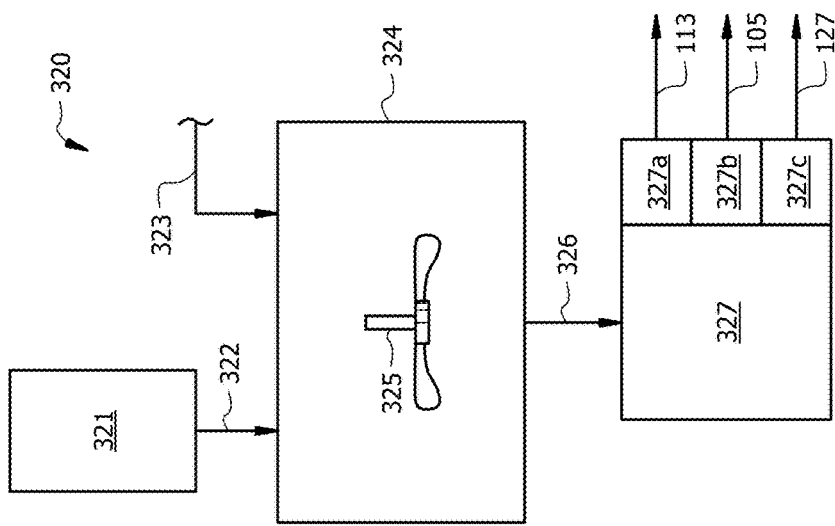
FIGS. 3A to 3C illustrates preparation system for the ferric compound solution, the acidic oxidant solution, and the flocculant-adsorbent solution.
Figure 3B:
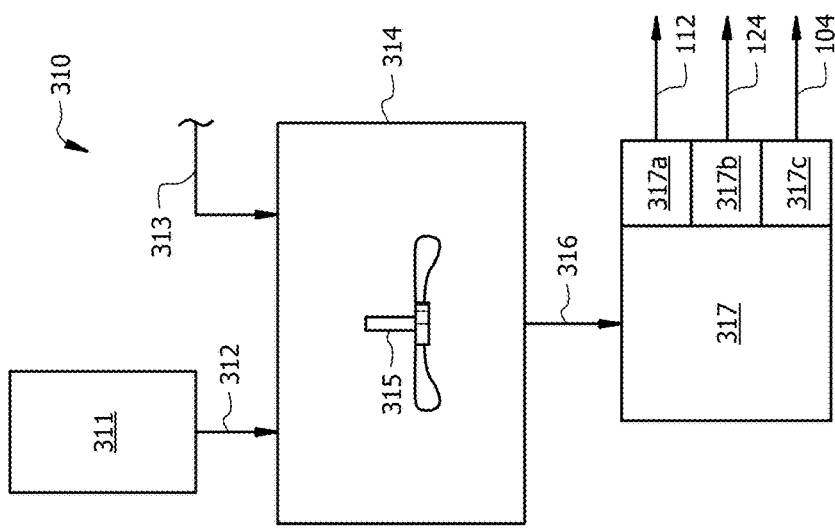
Figure 3A:
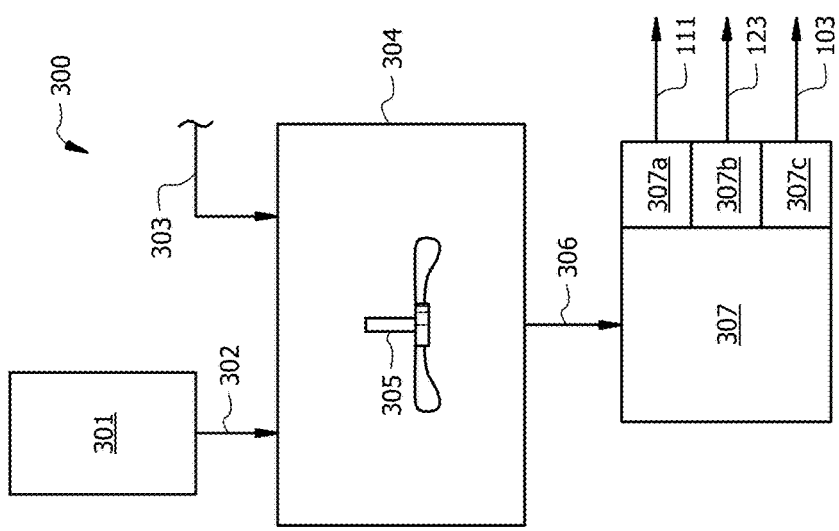

Aspects of the disclosed process and system 10 include preparation and dosing of the feed components. FIGS. 3A-3C illustrate process flow diagrams of the systems 300, 310, and 320 for preparation and dosing of the ferric compound solution, the acidic oxidant solution, and the flocculant-adsorbent solution, respectively.

Ferric Compound Preparation and Dosing

FIG. 3A illustrates an embodiment of a ferric compound solution preparation system 300 for the preparation and dosing of the ferric compound solution. As described above, the ferric compound solution can be fed to the redox reactor 110 and optionally to the clarifier 120. The ferric compound solution can be contacted with the acidic oxidant solution in-situ of the redox reactor 110 and optionally in-situ of the clarifier 120 to generate ferrate. It is contemplated that ferrate can be made ex-situ of the redox reactor 110 and clarifier 120 in a separate vessel by mixing the ferric compounds and acidic oxidant with water, then feeding the resulting ferrate solution to the redox reactor 110 and optionally to the clarifier 120.

The ferric compounds can be physically obtained as a solid in powder form or granular form, which may help to make it easy to handle, transport, and mix into the ferric compound solution. An example of the ferric compounds is a solid having a composition of 25 wt % iron (III), 5 wt % iron (II), 3 wt % sulfuric acid, 32 wt % $H_2O$, and 35 wt % sulfate. The ferric compounds can be stored in containers or silos, shown in FIG. 3A as a container 301, having a capacity to store an amount of solid powder suitable to operate the process for a desired time period. For example, the container 301 can store an amount of the ferric compound that will last at least one week in the continuous processes disclosed herein.

The ferric compounds can be mixed with water (e.g., potable water, local tap water provided by a municipality, etc.) from stream 303 to form a ferric compound solution containing 5% v/v ferric compounds. The solid powder can be transferred from the container 301 to a dilution tank 304 by any transport means available, such as conveyor or manual scoops, shown as stream 302. The clean water can be added to the dilution tank 304 from the utility water supply via stream 303. Once the dilution tank 304 is filled with the ferric compound solution, the ferric compound solution can be mixed with an agitator 305 such that the ferric compounds are well dispersed in the solution.

The volume of the dilution tank 304 can be sized to contain an amount of the ferric compound solution suitable for the process. For example, the amount of the ferric compound solution may be suitable to handle changes in flowrates within the system. As an example, the ferric compound solution may be stored in an amount that is used for one to three days in the process and system 10.

A ferric compound solution outlet line 306 can be connected to the dilution tank 304 and to a dosing pump 307. A flow rate of the ferric compound solution in the outlet line 306 can be in the range of 0 to 70 parts per million (by weight) at 5% v/v strength solution, and the disclosed systems and process allow for a controlled dosing of the ferric compound solution on a continuous basis while allowing for changing and/or controlling the dosage rate up or down depending on the flow rate of contaminated water in stream 102 to the redox reactor 110.

In embodiments, the dosing pump 307 can have two or three discharge heads 307a-c such that a single pump 307 can provide the ferric compound solution to two or three locations in controlled amounts or doses. A first discharge head 307a can be fluidly connected to an inlet of the redox reactor 110 via stream 111. A second discharge head 307b can be fluidly connected to an inlet of the clarifier 120 via stream 123. An optional third discharge head 307c can be fluidly connected to an inlet of the contaminated water buffer tank of pre-treatment system 100 via stream 103 (which can be upstream of the redox reactor 110 and can be connected to stream 102 to supply the contaminated water to the redox reactor 110). Alternatively, it is contemplated that pump 307 can be embodied as three dosing pumps that can be used and be fluidly connected to the ferric compound solution outlet line 306, with the first pump being fluidly connected to an inlet of the redox reactor 110 to provide a controlled amount or dose of the ferric compound solution to the redox reactor 110 via stream 111, the second pump being fluidly connected to an inlet of the clarifier 120 to provide a controlled amount or dose of the ferric compound solution to the clarifier 120 via stream 123, and the optional third pump being fluidly connected to the contaminated water buffer tank of pre-treatment system 100 to provide a controlled amount or dose of the ferric compound solution to the buffer tank 201 via stream 103.

In embodiments having a two-headed dosing pump or two single-headed dosing pumps, the flow of ferric compound solution in the outlet line 306 can be divided, with approximately 60 vol. %-90 vol. %, or about 85 vol % to the redox reactor 110 via stream 111 and between about 10 vol. %-40 vol. %, or about 15 vol % going to the clarifier 120 via stream 124, based on the total volumetric flow rate of the ferric compound solution in the outlet line 306. Put another way, a volumetric ratio of a first portion of the ferric compound solution in stream 111 to a second portion of the ferric compound solution in stream 123 to a third portion of the ferric compound solution in stream 103 can be between about 3:2:0 to 9:1:0, or about 8.5:1.5:0.

In embodiments having a three-headed dosing pump or three single-headed dosing pumps, the flow of ferric compound solution in the outlet line 306 can be divided into about 70-vol. %-90 vol. %, or about 80 vol % to the redox reactor 110 via stream 111, about 5 vol. % to about 20 vol. %, or about 10 vol % to the clarifier 120 via stream 123, and about 5 vol. % to about 20 vol. %, or about 10 vol % to the buffer tank 201 via stream 103, based on the total volumetric flow rate of the ferric compound solution in the outlet line. Put another way, a volume ratio of a first portion of the ferric compound solution in stream 111 to a second portion of the ferric compound solution in stream 123 to a third portion of the ferric compound solution in stream 103 can be between about 14:3:3 and 9:1:1, or about 8:1:1.

In embodiments, a volume ratio of a first portion of the ferric compound solution in stream 111 to a second portion of the ferric compound solution in stream 123 to a third portion of the ferric compound solution in stream 103 can be in the range of 8.5:1.5:0 to 8:1:1.

Acidic Oxidant Preparation and Dosing

FIG. 3B illustrates an embodiment of an acidic oxidant solution preparation system 310 for the preparation and dosing of the acidic oxidant solution. As described above, the acidic oxidant solution can be fed to the redox reactor 110 and optionally to the clarifier 120. The acidic oxidant solution can be contacted with the ferric compound solution in-situ of the redox reactor 110 and optionally in-situ of the clarifier 120 to generate ferrate. It is contemplated that ferrate can be made ex-situ of the redox reactor 110 and clarifier 120 in a separate vessel by mixing the ferric compounds and acidic oxidant with water, then feeding the resulting ferrate solution to the redox reactor 110 and optionally to the clarifier 120.

The acidic oxidant can generally be obtained as a solid in powder form, which is easy to handle and transport. The solid can generally be an oxidizing compound used for water treatment and can be sulfate-based. A commercially available example of the acidic oxidant is FeOxy-S2. The acidic oxidant can be stored in containers or silos, shown in FIG. 3B as container 311, having a capacity to store an amount of solid powder suitable for use for a desired time period in the continuous processes disclosed herein.

The acidic oxidant can be mixed with water (e.g., potable water, local tap water provided by a municipality, etc.) from stream 313 to form an acidic oxidant solution containing about 5% v/v acidic oxidant. The acidic oxidant solid powder can be transferred from the container 311 to a dilution tank 314 by any transport means available, such as conveyor or manual scoops, shown in FIG. 3B as stream 312. The water can be added to the dilution tank 314 from the water supply. Once the dilution tank 314 is filled with the acidic oxidant solution, the acidic oxidant solution can be mixed with an agitator 315 such that the acidic oxidant is well dispersed in the solution. The volume of the dilution tank 314 can be sized to contain an amount of the acidic oxidant solution that is used for a suitable time period in the process.

An acidic oxidant solution outlet line 316 can be connected to the dilution tank 314 and to a dosing pump 317. A flow rate of the acidic oxidant solution in the outlet line 316 can be in the range of 0 to 70 parts per million (by weight) at 5% v/v strength solution, and the disclosed systems and process allow for dosing of the acidic oxidant solution on a continuous basis while allowing for changing the dosage rate up or down depending on the flow of contaminated water in stream 102 to the redox reactor 110.

In embodiments, the dosing pump 317 can have two or three discharge heads 317a-c such that a single pump can provide the acidic oxidant solution to two or three locations in controlled amounts or doses. A first discharge head 317a can be fluidly connected to an inlet of the redox reactor 110 via stream 112 and a second discharge head can be fluidly connected to an inlet of the clarifier 120 via stream 124. An optional third discharge head 317c can be fluidly connected to an inlet of the contaminated water buffer tank 201 of pre-treatment system 100, which is described above, via stream 104. Alternatively, it is contemplated that the dosing pump 317 can be embodied as three dosing pumps that can be used and be fluidly connected to the acidic oxidant solution outlet line 316, with the first pump being fluidly connected to an inlet of the redox reactor 110 via stream 112 to provide a controlled amount or dose of the acidic oxidant solution to the redox reactor 110, the second pump being fluidly connected to an inlet of the clarifier 120 via stream 124 to provide a controlled amount or dose of the acidic oxidant solution to the clarifier 120, and the optional third pump being fluidly connected to the contaminated water buffer tank of pre-treatment system 100 to provide a controlled amount or dose of the acidic oxidant solution to the buffer tank via stream 104.

In embodiments having a two-headed dosing pump or two single-headed dosing pumps, the flow of acidic oxidant solution in the outlet line 316 can be divided, with approximately 60 vol. %-90 vol. %, or about 85 vol % to the redox reactor 110 via stream 112 and between about 10 vol. %-40 vol. %, or about 15 vol % to the clarifier 120 via stream 124, based on the total volumetric flow rate of the acidic oxidant solution in the outlet line 316. Put another way, a volume ratio of a first portion of the acidic oxidant solution in stream 112 to a second portion of the acidic oxidant solution in stream 124 to a third portion of the acidic oxidant solution in stream 104 can be between about 3:2:0 to 9:1:0, or about 8.5:1.5:0.

In embodiments having a three-headed dosing pump or three single-headed dosing pumps, the flow of acidic oxidant solution in the outlet line 316 can be divided into about 70-vol. %-90 vol. %, or about 80 vol % to the redox reactor 110 via stream 112, about 5 vol. % to about 20 vol. %, or about 10 vol % to the clarifier 120 via stream 124, and about 5 vol. % to about 20 vol. %, or about 10 vol % to the buffer tank 201 via stream 104, based on the total volumetric flow rate of the acidic oxidant solution in the outlet line 316. Put another way, a volume ratio of a first portion of the acidic oxidant solution in stream 112 to a second portion of the acidic oxidant solution in stream 124 to a third portion of the acidic oxidant solution in stream 104 can be between about 14:3:3 and 9:1:1, or about 8:1:1.

In embodiments, a volume ratio of a first portion of the acidic oxidant solution in stream 112 to a second portion of the acidic oxidant solution in stream 124 to a third portion of the acidic oxidant solution in stream 104 can be in the range of 8.5:1.5:0 to 8:1:1.

Flocculant-Adsorbent Preparation and Dosing

FIG. 3C illustrates an embodiment of a flocculant-adsorbent solution preparation system 320 for the preparation and dosing of the flocculant-adsorbent solution. Flocculant-adsorbents are used to agglomerate and coagulate the particulates that are produced by the ferrate in the redox reactor 110. The flocculant-adsorbent is generally obtained as a solid in powder form, which can be easy to handle and transport. The solid can generally be a compound used for water treatment. A commercially available example of the flocculant-adsorbent is FeOxy-S3. The flocculant-adsorbent can be stored in containers or silos, shown in FIG. 3C as container 321, having a capacity to store an amount of solid powder that will last one week in the continuous processes disclosed herein.

The flocculant-adsorbent can be mixed with clean water to form a flocculant-adsorbent solution containing 5% v/v flocculant-adsorbent. The flocculant-adsorbent solid powder can be transferred from the container 321 to a dilution tank 324 by any transport means available, such as conveyor or manual scoops, shown in FIG. 3C as stream 322. The clean water can be added to the dilution tank 324 from the utility water supply via stream 223. Once the dilution tank 324 is filled with the flocculant-adsorbent solution, the flocculant-adsorbent solution can be mixed with an agitator 325 such that the flocculant-adsorbent is well dispersed in the solution. The volume of the dilution tank 324 is sized to contain an amount of the acidic oxidant solution that is used for two days.

A flocculant-adsorbent solution outlet line 326 can be connected to the dilution tank 324 and to a dosing pump 327. A flow rate of the flocculant-adsorbent solution in the outlet line can be in the range of 0 to 70 parts per million (by weight) at 5% v/v strength solution, and the disclosed systems and process allow for dosing of the flocculant-adsorbent solution on a continuous basis while allowing for changing the dosage rate up or down depending on the flow of contaminated water to the redox reactor 110 via stream 102.

In embodiments, the dosing pump 327 can have one, two, or three discharge heads 327$a$-$c$ such that a single pump can provide the flocculant-adsorbent solution to one, two, or three locations in controlled amounts or doses. A first discharge head 327$a$ can be fluidly connected to a second compartment of the redox reactor 110 via stream 113. An optional second discharge head 327$b$ can be fluidly connected to an inlet of the plug flow flocculator in stream 203 of the pre-treatment system 100 via stream 105. An optional third discharge head 327$c$ can be fluidly connected to the sludge handling system 126 via stream 127. Alternatively, it is contemplated that one, two, or three separate dosing pumps can be used and be fluidly connected to the flocculant-adsorbent solution outlet line, with the first pump being fluidly connected to an inlet of the redox reactor 110 via stream 113 to provide a controlled amount or dose of the flocculant-adsorbent solution to the redox reactor, the optional second pump being fluidly connected to an inlet of the plug flow flocculator in stream 203 of the pretreatment system 100 via stream 105 to provide a controlled amount or dose of the flocculant-adsorbent solution to the water mixture in stream 203, and the optional third pump being fluidly connected to the sludge handling system 126 via stream 127 to provide a controlled amount or dose of the flocculant-adsorbent solution to the sludge handling system 126.

In embodiments having a single-headed dosing pump (a single dosing pump), the flow of flocculant-adsorbent solution in the outlet line 326 to the redox reactor 110 via stream 113 can be 100 vol % of the flow of the flocculant-adsorbent solution in the outlet line 326.

In embodiments having a two-headed dosing pump or two single-headed dosing pumps, the flow of flocculant-adsorbent solution in the outlet line 326 can be divided with approximately 60 vol. %-90 vol. %, or about 85 vol % to the redox reactor 110 via stream 113 and between about 10 vol. %-40 vol. %, or about 15 vol % to the sludge handling system 126 via stream 127, based on the total volumetric flow rate of the flocculant-adsorbent solution in the outlet line 326. Put another way, a volume ratio of a first portion of the flocculant-adsorbent solution in stream 113 to a second portion of the flocculant-adsorbent solution in stream 127 to a third portion of the flocculant-adsorbent solution in stream 105 can be between about 3:2:0 to 9:1:0, or about 8.5:1.5:0.

In embodiments having a three-headed dosing pump or three single-headed dosing pumps, the flow of flocculant-adsorbent solution in the outlet line 326 can be divided into about 70-vol. %-90 vol. %, or about 80 vol % to the redox reactor 110 via stream 113, about 5 vol. % to about 20 vol. %, or about 10 vol % to the sludge handling system 126 via stream 127, and about 5 vol. % to about 20 vol. %, or about 10 vol % to the pre-treatment system 100 via stream 105, based on the total volumetric flow rate of the flocculant-adsorbent solution in the outlet line 326. Put another way, a volume ratio of a first portion of the flocculant-adsorbent solution in stream 113 to a second portion of the flocculant-adsorbent solution in stream 127 to a third portion of the flocculant-adsorbent solution in stream 105 can be 8:1:1.

In embodiments, a volume ratio of a first portion of the flocculant-adsorbent solution in stream 113 to a second portion of the flocculant-adsorbent solution in stream 127 to a third portion of the flocculant-adsorbent solution in stream 105 can be in the range of 8.5:1.5:0 to 8:1:1.

Redox Reactor

Referring again to FIG. 1, the redox reactor 110 can be configured for oxidation-reduction reactions to take place in order to remove contaminants in the contaminated water received via stream 102. The redox reactor 110 can be manufactured of any material suitable for the functions described herein. In an embodiment, the redox reactor 110 can be formed from concrete and is below the ground. In some embodiments, the redox reactor 110 can be formed of a suitable metal, plastic, plastic coated metal, or the like and formed as a tank that can be placed above or below ground. The redox reactor 110 can have a volume suitable to treat water for a particular application on a continuous basis, e.g., 100, 200, 300, 400, 500, 600, 700, 800, 900, 1000, or more m$^3$/h of contaminated water. In embodiments, the redox reactor 110 can be embodied as multiple below-ground vessels connected in series with one another, connected in parallel relative to one another, or one or more vessels connected in series with one or more vessels connected in parallel.

In some aspects, the redox reactor 110 can have a first section or compartment 110a and a second section or compartment 110b. The first section 110a and the second section 110b are separated by a partition or wall 117 having an underflow opening 118 for passage of material from the first section 110a to the second section 110b. The first section 110a can be configured to receive contaminated water from stream 102, receive the ferric compound solution from stream 111, receive the acidic oxidant solution from stream 112, mix the solutions to form a first amount of ferrate, and to contact the first amount of ferrate with the contaminated water for reaction with contaminants at a residence time of 0-60 minutes (e.g., 1, 2, 3, 4, 5, 6, 7, 8, 9, 10, 15, 20, 25, 30, 35, 40, 45, 50, 55, or 60 minutes). The steps in the first section 110a can happen simultaneously for the continuous process and system 10. The second section 110b can be configured to receive the reacted water from the first section, receive the flocculant-adsorbent solution from stream 113, mix the reaction mixture, allow for further ferrate reaction with contaminants to form larger particulate contaminants, and allow for flocculation and adsorption of particulate contaminants into flocs, at a residence time of 10-60 minutes (e.g., 10, 11, 12, 13, 14, 15, 16, 17, 18, 19, 20, 21, 22, 23, 24, 25, 30, 35, 40, 45, 50, 55, or 60 minutes). These steps in the second section 110b can happen simultaneously for the continuous process and system 10 to produce redox water. In some embodiments, the residence time in the first section of the redox reactor 110 is 10 minutes and the residence time in the second section of the redox reactor 110 is 20 minutes.

In embodiments, the redox reactor 110 can have at least one motorized flash agitator contained therein, configured to enhance mixing of the ferric compound solution and the acidic oxidant solution to form ferrate and to enhance contact of the ferrate with the contaminated water in the redox reactor 110.

In embodiments of the redox reactor 110 having two sections, the first section 110a can have a motorized flash agitator as described above, and the second section 110b can have at least one motorized slow paddle agitator to enhance mixing of the flocculant-adsorbent with the reaction mixture, and to keep the flocs suspended in the fluid.

Ferrate anions (chemical formula $(FeO_4)^{2-}$) are negatively charged ions in which iron is in the +6 oxidation state. Ferrate anions as discussed herein can also be referred to as ferrate (VI), iron (VI), or Fe (VI). Ferrate anions are extremely powerful oxidizing agents compared to other AOP technologies. The redox potential for ferrate is higher than other chemicals available for water treatment as shown in the table below:

| Compound | Redox Potential (Volts) |
| --- | --- |
| Ferrate | 2.20 |
| Ozone | 2.08 |
| Hydrogen Peroxide | 1.78 |
| Permanganate | 1.68 |
| Hypochlorite | 1.48 |
| Chlorine | 1.36 |
| Dissolved oxygen | 1.23 |
| Chlorine dioxide | 0.95 |

The process and system is configured herein such that the ferrate simultaneously functions as an oxidant, disinfectant, and coagulant. Ferrate is more powerful than other oxidants such as ozone and chlorine dioxide (as indicated above), and it can be used instead of additional coagulants such as ferric chloride, alum, and polymers for the removal of metals, non-metals and humic acids. Ferrate can outperform other disinfectants such as UV, hydrogen peroxide, and chlorine, and can kill many chlorine resistant organisms such as aerobic spore-formers and sulfite-reducing clostridia.

The purity of ferrate formed in-situ of the redox reactor 110 can be greater than 99% in the mixed form. A ferrate content monitor be coupled with the stream 115 and configured to measure the oxidation-reduction potential (ORP) of the reduced and oxidized water in stream 115. The potential can be correlated with the purity (weight, mol, or volume basis) of ferrate formed in-situ of the redox reactor 110. For example, a measured ORP of 2.20 V in the reduced and oxidized water in stream 115 can indicate that the purity of ferrate formed in-situ of the redox reactor 110 is 100% ferrate, and a measured ORP of 2.10 in the reduced and oxidized water in stream 115 can indicate that the purity of ferrate formed in-situ of the redox reactor 110 is 95.55% ferrate. Using the high purity ferrate, there is no need to dose poisonous and corrosive components like chlorine, hypochlorite, or ozone. These oxidants have deleterious side effects. Additionally, the handling of chlorine, hypochlorite, HOCl, chlorine dioxide or ozone are potential danger to workers due to their high toxicity. Moreover, a major disadvantage of chlorine and chlorine dioxide or any other chlorine-containing compound is that they produce, chloramines, chlorinated aromatics, chlorinated amines, or hydrocarbons. All these oxidants are potential mutagens or carcinogens.

Inter gas (e.g., nitrogen) for the inert gas blanket over the reaction mixture in the redox reactor 110 can be supplied by an inert gas source connected to the redox reactor 110.

The reduced and oxidized water in stream 115 from the redox reactor 110 can contain a high amount (e.g., 1,000-1,500 mg/L) of non-abrasive and agglomerated contaminant flocs, as well as the water. In some embodiments, the redox water in stream 115 can also contain unreacted contaminants, for example, if the contaminant stream contained more contaminants than redox capacity of the redox reactor 110 (e.g., ferrate supply is exhausted for a given amount of water reacted for the set residence time), or if not all the contaminants were reacted within the residence time of the redox reactor 110.

A pump (e.g., a low shear centrifugal pump) can be included in stream 115 to transfer the redox water from the redox reactor 110 to the clarifier 120.

Vent gas can be vented via stream 114. The vent gas stream 114 can contain a majority amount of nitrogen from the optional nitrogen blanket, and also water vapor. In some applications, such as for treatment of produced water from an oil and gas well, the vent gas stream 114 can also contain gases received from the contaminant stream 102, such as light hydrocarbons (e.g., methane, ethane, propane, butane, pentane, or combinations thereof) and acid gases (e.g., carbon dioxide, hydrogen sulfide, or a combination thereof).

Clarifier

Referring again to FIG. 1, the clarifier 120 can be configured for bulk solids and particulate removal using gravity sedimentation. The clarifier 120 can be manufactured from any material suitable for the functions described herein. In an embodiment, the clarifier 120 can be formed of concrete and is an above-ground vessel. In some embodiments, the clarifier 120 can be formed from a metal, plastic, plastic coated metal, or other material. In some embodiments, the clarifier 120 can have a conical-shaped bottom portion 120c, and the stream 122 can be connected to the center point of the conical-shaped bottom portion 120c. The clarifier 120 can have a volume suitable to clarify water for a particular application on a continuous basis, e.g., 100, 200, 300, 400, 500, 600, 700, 800, 900, 1000, or more m$^3$/h of contaminated water. In embodiments, the clarifier 120 can multiple vessels connected in series with one another, connected in parallel relative to one another, or one or more vessels connected in series with one or more vessels connected in parallel.

In embodiments, the residence time of the redox water in the clarifier 120 can be between about half an hour and three hours. For example, the residence time can be about 30-180 minutes, or between about 60-120 minutes, for example 60, 70, 80, 90, 100, 10, or 120 minutes. For example, the residence time in the clarifier 120 can be about 90 minutes.

In embodiments, the clarifier 120 can be configured to receive the ferric compound solution via stream 123 (e.g., dosed intermittently or continuously) and to receive the acidic oxidant solution via stream 124 (e.g., dosed intermittently or continuously), which will form additional ferrate in-situ of the clarifier 120. The additionally formed ferrate can remove any unreacted contaminants that are received in the clarifier 120 from the redox reactor 110 via stream 115. As such, the clarifier 120 can also be configured to be a redox-reactor while functioning as a clarifier, since ferrate is formed in the clarifier 120 and available for redox reaction with suitable contaminants.

The clarifier 120 can include a skimmer. Floatable solids (scum) including foams can be removed from the surface of the redox water in the clarifier 120 by the skimmer, while sludge (e.g., the contaminant flocs and other particulate contaminants that form the sludge) can be collected on the bottom of the clarifier 120.

The clarifier 120 can include a motorized sludge rake configured to keep the sludge at the conical-shaped bottom portion 120c of the clarifier 120 in a flowable/movable form and to direct the sludge toward the center of conical-shaped bottom portion 120c. The sludge at the bottom of the clarifier 120 can be intermittently routed to the sludge handling system 126 via a sludge transfer pump located in stream 122. The sludge transfer pump can be progressive cavity type pump that is designed to intermittently deliver a constant flow of oxidation sludge to the sludge handling system 126 via stream 122. A flow rate of the sludge in stream 122, when the pump is on, can be between about 5 and about 35 m$^3$/h, for example about 5, 10, 15, 20, 25, 30, or 35 m$^3$/h.

The clarifier 120 can also include a main compartment 120a and a clarified water chamber 120b. The main compartment 120a can include the conical-shaped bottom portion 120c for collecting the sludge, and the clarified water chamber 120b can be fluidly connected to the main compartment 120a at a location above the conical-shaped bottom portion 120c such that clarified water flows into the chamber 120b. The main compartment 120a can be configured to i) receive at least a portion 115b of the redox water via stream 115, the ferric compound solution via stream 123, and the acidic oxidant solution via stream 124, ii) mix the ferric compound solution and the acidic oxidant solution to form a second amount of ferrate (the second amount being less than the first amount formed in the redox reactor 110 since redox reaction is a secondary function of the clarifier 120), iii) contact the second amount of ferrate with the redox water for reaction with unreacted contaminants in the redox water, and iv) allow particulate contaminants and flocs to settle to a conical-shaped bottom portion 120c of the clarifier 120. These steps in the main compartment 120a can happen simultaneously for the continuous process and system 10 to clarified water. The clarified water chamber 120b can be configured to receive clarified water from the main compartment 120a. One or more centrifugal pumps can be included in stream 121 to pump the clarified water to the two-stage filtration system 150.

Sludge Treatment System

Figure 4:
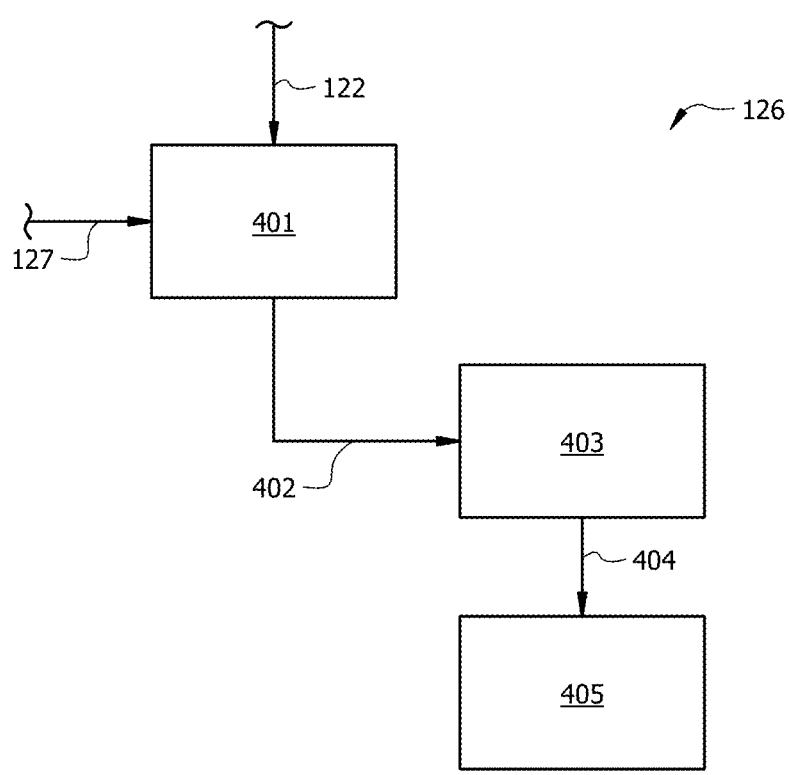
FIG. 4 illustrates a process flow diagram of an embodiment of the sludge handling system of FIG. 1.

FIG. 4 illustrates a process flow diagram of an embodiment of the sludge handling system 126. The sludge handling system 126 can include a sludge thickener 401, a decanter centrifuge 403, and a sludge container 405.

The sludge thickener 401 is a vessel that is connected to stream 122 and configured to receive sludge from the clarifier 120 via the stream 122. The sludge thickener 401 can also be configured to connect with stream 127 so as to receive a dose of the flocculant-absorbent solution (e.g., 10-15 wt % of the flocculant-absorbent solution flowing in outlet 328) that promotes further flocculation and agglomeration of contaminants to thicken the sludge in the sludge thickener 401. Another sludge transfer pump located in stream 402 can move thickened sludge from the sludge thickener 401 to the decanter centrifuge 403, where the solids in the sludge can be separated from liquid by centrifugal forces and the solids are recovered in stream 404 and sent to sludge container 405. The sludge container 405 can be embodied as any vessel in which an amount of sludge can be stored for disposal or use in another application.

The sludge recovered in container 405 can be considered a "safe sludge" in the sense that it can be used in other applications and is not simply an item for hazardous waste disposal. That is, in contrast to other APO techniques, the disclosed process and systems create a "safe sludge" that is relatively (compared to other sludges) more inert to the environment (e.g., has no chemical oxygen demand) and can be used, for example, as an additive for cement.

Filters

The clarified water from the clarifier 120 can be fed to a two-stage filtration system 150 via a filter feed pump in stream 121.

First Filtration Stage

The first stage of media filtration can use an advanced catalytic media (ACM) filtration. The first stage of the system 150 can contain one or more ACM filters 130. When more than one ACM filter is used, the ACM filters 130 can be fluidly connected in parallel relative to one another. Each ACM filter 130 can be configured to remove the fine particulates, organic materials (e.g., aliphatic organic compounds, aromatic organic compounds, or both aliphatic and aromatic organic compounds), and heavy metals (e.g., Zinc, Arsenic, Aluminum, Copper, Cadmium, Manganese, or a combination thereof) from the clarified water, and to reduce the turbidity of the clarified water. Each ACM filter 130 generally includes a filter media contained in a filter housing, where the housing has an inlet for the clarified water and an outlet for first filtered water.

In embodiments, the media of each ACM filter 130 can have a composition that includes clinoptilolite (($Ca,K_2,Na_2,Mg)_4Al_8Si_{40}O_{96} \cdot 24H_2O$), manganese dioxide ($MnO_2$), and/or calcium hydroxide ($Ca(OH)_2$). A commercially available ACM filter is the Katalox Light ACM filter manufactured by Watch Water GmbH, having >85% w/w clinoptilolite, >10% w/w $MnO_2$, and <5% w/w $Ca(OH)_2$.

In embodiments, each ACM filter in the first stage is capable of processing 100-300 m3/h of clarified water; alternatively, 150-250 m3/h of clarified water; alternatively, 175-240 m3/h of clarified water; alternatively, 200-230 m3/h of clarified water; alternatively, 215-225 m3/h of clarified water; alternatively, about 220 m3/h of clarified water.

In some embodiments, the first stage includes three ACM filters 130 operated in 3×33% configuration during normal operation, and operated in 2×50% configuration when one of the three ACM filters 130 is offline for backwashing, maintenance, replacement, etc.

In some aspects, the ACM filter can have a catalytic coating on the surface of the filter media that contacts the clarified water. For example, the catalytic coating can be manganese dioxide ($MnO_2$) on a special adsorbent media. Having the catalytic coating on the filter media enables the ACM filter to function as a mechanical filter and catalytic filter. The concentration of $MnO_2$ on the surface of the ACM filter media can be between about 5 wt. % and about 20 wt. %, or about 10 wt. % based on a total weight of the filter media. The presence of the $MnO_2$ catalytic coating on the ACM filter media in such an amount increases the oxidation and co-precipitation of contaminants over filters having a lower concentration of catalytic coating.

The ACM filter can be lighter in weight, have a higher filtration surface, have longer service life, have more reliable performance, and provide filtration down to about 3 μm, which is an improvement over other existing granular filter media.

The inlet to each of the ACM filter can have a flow control valve (with respective flow transmitter) to ensure equal distribution of the flow across the filters.

The ACM filter 130 can be configured with appropriate piping and valves for backwashing on an intermittent basis, for example, every 24 hours of operation or triggered by a differential pressure across the filter that is higher than a setpoint pressure value. Treated water from a treated water tank can be pumped by one or more backwash pumps to backwash the ACM filter 130.

Flow Control First Filtration Stage

In embodiments where the ACM filter 130 is embodied as multiple filters connected in parallel, stream 121 can be split into a portion for each ACM filter 130. Each portion of the stream 121 can have a flow control valve and a flow transmitter placed therein and coupled to one another. The flow transmitter can be configured to send a flow signal which is compared by a controller against the flow controller setpoint to ensure a constant and equal inlet flowrate for through each portion of stream 121 to each ACM filter 130.

Additionally, the flow controller can increase the % open of the flow control valves if the water level in the clarified water chamber 120b of the clarifier 120 rises above a threshold limit (as detected by a level transmitter connected to the clarified water chamber 120b and to the flow controller). Alternatively, the flow controller can decrease the % open of the flow control valves if the water level in the clarified water chamber 120b of the clarifier 120 falls below a threshold limit (as detected by the level transmitter). The flow rate of each portion of stream 121 can be maintained to be equal with one another to maintain equal flow through each of the ACM filters 130.

In some embodiments, a total flowrate through the multiple ACM filters 130 can be calculated by the flow controller, and the level signal from the level transmitter of the clarifier can be using in combination with the total flow rate through the multiple ACM filters 130 to actuate valves and pumps associated with the clarified water level in the clarified water chamber 120b of the clarifier 120.

In embodiments where the ACM filter 130 is embodied as N filters connected in parallel, the flow rate of each portion of stream 121 is the total flow rate in stream 121 divided N, where N is the number of ACM filters 130 that is online.

Second Filtration Stage

The first filtered water in stream 131 from the first stage filtration (e.g., the ACM filter) 130 can be filtered in the second stage filtration (e.g., the CC filter 140) of the two-stage filtration system 150.

The second filtration stage of media filtration can use catalytic carbon (CC) filtration to remove biological organisms (e.g., bacteria that have biological oxygen demand) and other materials (e.g., humic substances, tannins and lignin, hydrogen sulfide ($H_2S$), chloramines, phenols, or a combination thereof). The second stage can contain one or more CC filters 140 fluidly connected in parallel relative to one another. Each CC filter 140 can include a CC filter media contained in a filter housing, where the housing has an inlet for the first filtered water and an outlet for second filtered water (the treated water in stream 141).

In embodiments, the filter media of the CC filter 140 can include a composition of carbon and iron hydroxide (FeO(OH)). An examples of a commercially available CC filter is the Catalytic Carbon CC filter manufactured by Watch Water GmbH, having a composition of >85% w/w carbon and <15% w/w iron hydroxide.

In embodiments, the CC Filter 140 can have iron particles coated inside and outside the micro-pores of catalytic carbon media. The iron particle coating can eliminate the need of expensive ion-exchange and membrane processes.

In embodiments where the CC filter 140 includes at least two CC filters 140 connected in parallel, the inlet to each of the CC Filter 140 can include a flow control valve (with respective flow transmitter) to ensure equal distribution of the flow across the filters.

The CC filter 140 can be configured with appropriate piping and valves for backwashing on an intermittent basis, for example, every 24 hours of operation or triggered by a differential pressure across the filter that is higher than a setpoint pressure value. Treated water from a treated water tank can be pumped by one or more backwash pumps to backwash the CC filter 140.

Flow Control Second Filtration Stage

In embodiments where the CC filter 140 is configured as multiple filters connected in parallel, stream 131 can be split into a portion for each CC filter 140. Each portion of the stream 131 can have a flow control valve and a flow transmitter placed therein and coupled to one another. The flow transmitter can be configured to send a flow signal which is compared by a controller against the flow controller setpoint to ensure a constant and equal inlet flowrate for through each portion of stream 131 to each CC filter 140.

Additionally, the flow controller can increase the % open of the flow control valves when the flow transmitter indicates that flow in the portion of stream 131 is decreasing, and the flow controller can decrease the % open of the flow control valves when the flow transmitter indicates that the flow in the portion of stream 131 is increasing.

In some embodiments, a total flowrate through the multiple CC filters 140 can be calculated by the flow controller, and the total flowrate can be used by the flow rate controller to calculate the flow ratio and proportions for each of the CC filters 140 that is online.

In embodiments where the CC filter 140 can be configured or embodied as N filters connected in parallel, the flow rate of each portion of stream 131 is the total flow rate in stream 131 divided N, where N is the number of CC filters 140 that is online.

Figure 5:
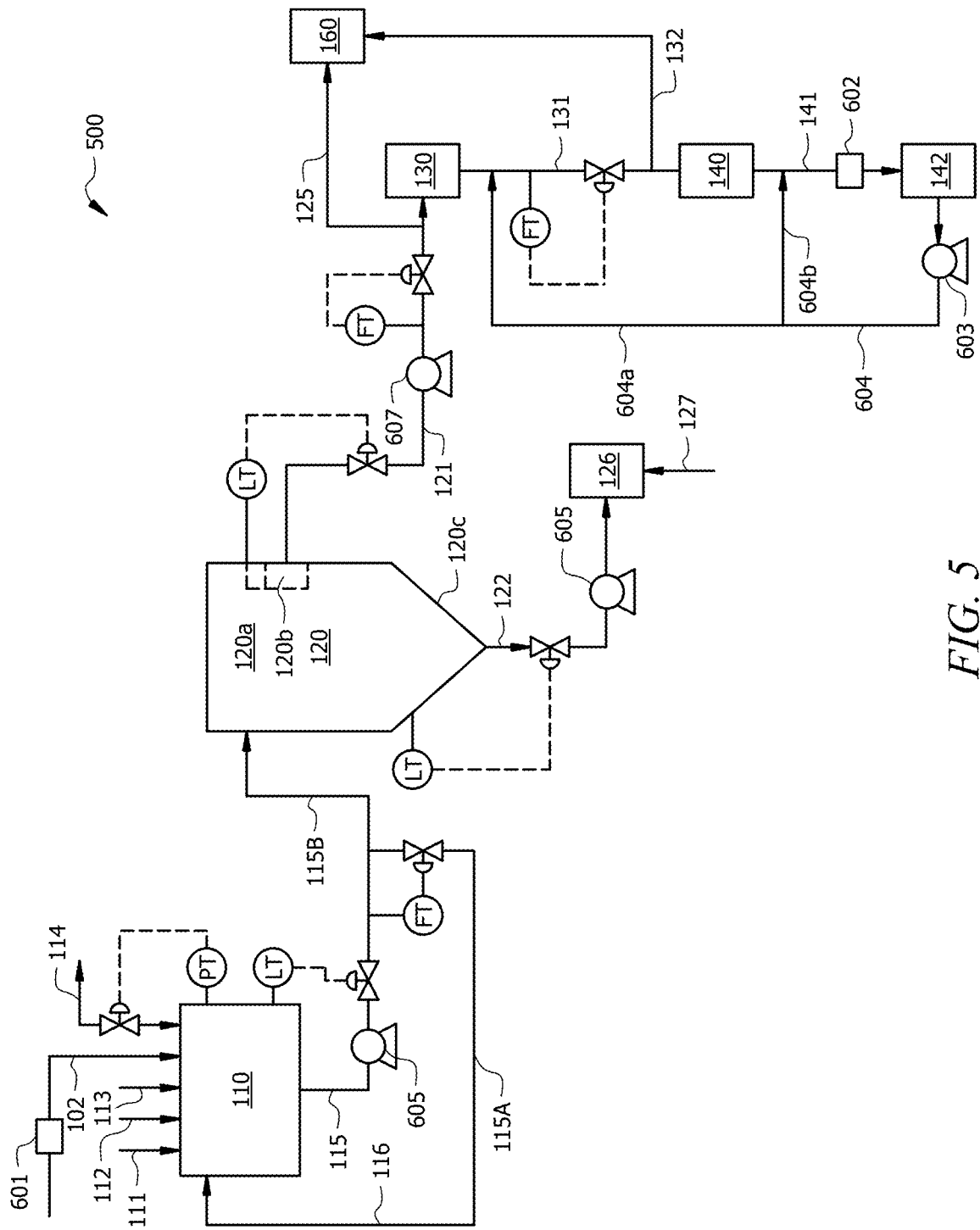
FIG. 5 illustrates a process flow diagram of the continuous water treatment process and system, with exemplary control instrumentation illustrated.

FIG. 5 illustrates a process flow diagram of the continuous water treatment process and system 500, with exemplary control instrumentation illustrated. Components that are the same as shown in FIG. 1 are given the same reference numerals.

Pumps 605, 606, and 607 can be seen added to streams 115, 122, and 121, respectively. The pumps 605, 606, and 607 are configured to facilitate of the fluid through the respective streams.

A first water analyzer 601 is placed in stream 102 for online analysis of the contents of the contaminated water in stream 102. Similarly, a second water analyzer 602 is placed in stream 141 for online analysis of the treated water in stream 141. Generally, the concentration of any contaminant discussed herein is less in the treated water stream 141 than in the contaminated water stream 102. The process, in these embodiments, can include analyzing the concentration of a contaminant in the contaminated water and analyzing the concentration of the same contaminant in the treated water.

FIG. 5 also shows piping for backwashing the filters 130 and 140. The water used for backwashing the filters 130 and 140 is pumped from a treated water tank 142 (connected to the treated water stream 141 and configured to store treated water) by pump 603 to the filters 130 and 140. The pump 602 can be placed in stream 604, which is connected to the treated water tank 142. Stream 604 can be configured to split into a first stream 604a and a second stream 604b. Stream 604a can be connected to stream 131, and stream 604b is connected to stream 141. During backwash of the ACM filter(s) 130, treated water flows through stream 604, stream 604a, stream 131, filter(s) 130, stream 121, stream 125, and then to the dirty backwash water sump 160. During backwash of the CC filter(s) 140, treated water flows through stream 604, stream 604b, stream 141, filter(s) 140, stream 131, stream 132, and then to the dirty backwash water sump 160.

Various transmitters can be seen in FIG. 5, with flow transmitters FT, pressure transmitters PT, level transmitters LT indicated in various locations and configured to send a signal to a controller for actuation of valve that control the flow of fluid in the process and system 500.

For example, a pressure transmitter can be included in the redox reactor 110 for actuation of a valve in the vent gas stream 114, so as to control the flow of vent gas in vent gas stream 114 (e.g., allow flow upon pressure in the redox reactor 110 exceeding a setpoint pressure, disallow flow upon the pressure falling below the setpoint pressure). A level transmitter can be included in the redox reactor 110 for actuation of a valve in stream 115, so as to control a level of redox water in the redox reactor 110 (e.g., allow flow upon a level exceeding a setpoint level, disallow flow upon the level falling below the setpoint level). A flow transmitter can be included in the redox water stream 115 for actuation of a valve in the recycle stream 116, so as to control the flow of redox water to the clarifier 120 (e.g., allow recycle upon a flow rate exceeding a setpoint flow rate, disallow recycle upon the flow rate falling below the setpoint flow rate).

A level transmitter can be included in the clarified water chamber 120b of the clarifier 120 for actuation of a valve in the clarified water stream 121, so as to control a level of clarified water in the chamber 120b (e.g., allow flow upon a level exceeding a setpoint level, disallow flow upon the level falling below the setpoint level). A level transmitter can be included in the conical-shaped bottom portion 120c of the clarifier 120 for actuation of a valve in stream 122, so as to control a flow of sludge to the sludge handling system 126 (e.g., allow flow upon a level exceeding a setpoint level, disallow flow upon the level falling below the setpoint level).

A flow transmitter can be included in stream 121 upstream of the two-stage filtration system 150 (e.g., upstream of the first stage or ACM filter(s) 130) for actuation of a valve placed in stream 121 between the flow transmitter and the ACM filter(s) 130), so as to control a flow of clarified water to the two-stage filtration system or to control a flow of backwash water so that backwash water does not flow upstream in stream 121, and instead flows via stream 125 to the dirty backwash water sump 160. A flow transmitter can be included in stream 131 between the stages of the two-stage filtration system 150 (e.g., between the first stage or ACM filter(s) 130 and the second stage or CC filter(s) 140) for actuation of a valve placed in stream 131 between the flow transmitter and the CC filter(s) 140), so as to control a flow of filtered water to the CC filter(s) 140 or to control a flow of backwash water so that backwash water does not flow upstream in stream 131 to the ACM filter(s) 130, and instead flows via stream 132 to the dirty backwash water sump 160.

Applications of the disclosed process and system include, but are not limited to, municipal wastewater treatment, municipal drinking water treatment, industrial wastewater treatment, seepage water (from water storage caverns), and produced water (produced from an oil and gas well) treatment. In municipal wastewater treatment and industrial wastewater treatment, the disclosed process and system can be used for sulfide removal, ammonia reduction, degradable and non-degradable chemical oxygen demand (COD) removal, biological oxygen demand (BOD5) removal, and heavy metals removal. In municipal drinking water treatment, the disclosed process and system can be used for TOC removal, trihalomethane (THM) reduction, and algae control. In produced water treatment, the disclosed process and system can be used for biocide for sulfur-reducing bacteria, TDS reduction, sulfides removal, and chemical oxygen demand (COD) reduction.

The disclosed continuous process and system can be scaled to any size for a particular application, since the treatment is continuous. Moreover, the system can be fabricated in process modules, and the modular design of the system allows easy transport to any location. Moreover, the discloses continuous process and system can be stand-alone or can be integrated with existing facilities (e.g., existing drinking water treatment facility, wastewater treatment facility, or industrial waste treatment facility).

The disclosed continuous process and system also produce treated water that can be reintroduced into sewage treatment, reinjected into an enhanced oil recovery (EOR) reservoir, or discharged into an open body of water (e.g., streams, lakes, seawater). This cannot be accomplished with other AOP technologies that use chlorine-based chemicals and/or that produce sodium hydroxide because, for example, bleach is hazardous and mostly banned disinfectant/oxidant in oil and gas facilities, caustic soda requires utmost care in handling, and ferric chloride compounds are unstable and gives the treated water an undesirable color if not fully reacted.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the terms "optionally," "may," "might," "possibly," and the like with respect to any element of a claim means that the element is required, or alternatively, the element is not required, both alternatives being within the scope of the embodiments. Also, references to examples are merely provided for illustrative purposes, and are not intended to be exclusive.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Aspects disclosed herein include:

Aspect 1: A process for treatment of a contaminated water stream, comprising: contacting the contaminated water with ferrate in a redox reactor to produce a redox water; removing particulate contaminants from the redox water in a clarifier to produce a clarified water; and filtering at least a portion of the clarified water in a two-stage filtration system to produce a treated water, wherein each step of the process is performed on a continuous basis.

Aspect 2: The process of Aspect 1, further comprising: feeding a first portion of a ferric compound solution to the redox reactor; feeding a first portion of an acidic oxidant solution to the redox reactor; and contacting a ferric compound and an acidic oxidant to form the ferrate in-situ of the redox reactor.

Aspect 3: The process of Aspect 1 or 2, further comprising: feeding a second portion of the ferric compound solution to the clarifier; and feeding a second portion of the acidic oxidant solution to the clarifier.

Aspect 4: The process of Aspect 1, 2, or 3, further comprising: feeding a raw source water to a buffer tank; feeding a third portion of the ferric compound solution to the buffer tank; feeding a third portion of the acidic oxidant solution to the buffer tank; and removing the contaminated water from the buffer tank.

Aspect 5: The process of Aspect 4, wherein 1) a volume ratio of the first portion to the second portion to the third portion of the ferric compound solution is in the range of 3:2:0 to 8:1:1; 2) a volume ratio of the first portion to the second portion to the third portion of the acidic oxidant solution is 3:2:0 to 8:1:1; or both 1) and 2).

Aspect 6: The process of any of Aspects 1 to 5, further comprising feeding first portion of a flocculant-adsorbent solution to the redox reactor; optionally further comprising pumping a sludge from the clarifier to a sludge handling system, and feeding a second portion of the flocculant-adsorbent solution to a sludge thickener of the sludge handling system; optionally further comprising flowing a portion of the clarified water to a dirty backwash water sump, flowing a portion of a filtered water to the dirty backwash water sump, and feeding a third portion of the flocculant-adsorbent solution to the dirty backwash water sump; optionally, wherein a volume ratio of the first portion to the second portion to the third portion of the flocculant-adsorbent solution is 8:1:1.

Aspect 7: The process of any of Aspects 1 to 6, further comprising: analyzing a first concentration of a contaminant in the contaminated water; and analyzing a second concentration of the contaminant in the treated water, wherein the first concentration is greater than the second concentration.

Aspect 8: The process of any of Aspects 1 to 6, wherein filtering at least a portion of the clarified water in the two-stage filtration system comprises: filtering at least a portion of the clarified water in an advanced catalytic media filter to produce a filtered water, and filtering at least a portion of the filtered water in a catalytic carbon filter to produce the treated water.

Aspect 9: A ferrate-based water treatment system comprising: a ferric compound solution preparation system configured to prepare ferric compound solution; an acidic oxidant solution preparation system configured to prepare an acidic oxidant solution; a flocculant-adsorbent solution preparation system configured to prepare a flocculant-adsorbent solution; a redox reactor fluidly coupled to the ferric compound solution preparation system and to the acidic oxidant solution preparation system and to the flocculant-adsorbent solution preparation system; a clarifier fluidly coupled to the redox reactor, to the ferric compound solution preparation system, and to the acidic oxidant solution preparation system; and a two-stage filtration system coupled to the clarifier.

Aspect 10: The system of Aspect 9, wherein the redox reactor has a first section fluidly coupled with a second section; wherein the first section is configured to i) receive contaminated water, the ferric compound solution, and the acidic oxidant solution, ii) mix the ferric compound solution and the acidic oxidant solution to form a first amount of ferrate, and iii) contact the first amount of ferrate with the contaminated water for reaction with contaminants to produce a reacted water; and wherein the second section is configured to i) receive the reacted water from the first section, ii) receive the flocculant-adsorbent solution, iii) mix the reacted water and the flocculant-adsorbent solution to produce a reaction mixture, iv) allow for further ferrate reaction with contaminants to form larger particulate contaminants, and v) allow for flocculation and adsorption of particulate contaminants into flocs, and vi) produce a redox water.

Aspect 11: The system of Aspect 9 or 10, wherein the clarifier has a main compartment fluidly coupled with a clarified water chamber; wherein the main compartment is configured to i) receive the redox water, the ferric compound solution, and the acidic oxidant solution, ii) mix the ferric compound solution and the acidic oxidant solution to form a second amount of ferrate, iii) contact the second amount of ferrate with the redox water for reaction with unreacted contaminants in the redox water, iv) allow particulate contaminants and flocs to settle to a conical-shaped bottom portion of the clarifier; and wherein the clarified water chamber is configured to receive clarified water from the main compartment.

Aspect 12: The system of any of Aspects 9 to 11, wherein the two-stage filtration system comprises a first stage and a second stage, wherein an effluent of the first stage is received by the second stage.

Aspect 13: The system of Aspect 12, wherein 1) the first stage comprises one or more advanced catalytic media filters, 2) the second stage comprises one or more catalytic carbon filters, or 3) a combination of 1) and 2).

Aspect 14: The system of any of Aspects 12 to 13, further comprising: a dirty backwash water sump fluidly coupled to i) a clarified water stream that fluidly connects the clarifier to the first stage of the two-stage filtration system, ii) a first filtered water stream that fluidly connects the first stage to the second stage, and iii) to the flocculant-adsorbent solution preparation system.

Aspect 15: The system of any of Aspects 9 to 14, further comprising: a pre-treatment system fluidly coupled to the redox reactor, wherein the redox reactor is configured to receive contaminated water from the pre-treatment system, wherein a buffer tank of the pre-treatment system is fluidly coupled to the ferric compound solution preparation system and to the acidic oxidant solution preparation system; and a sludge handling system fluidly coupled to a conical-shaped bottom portion of the clarifier and to the flocculant-adsorbent solution preparation system.

While several embodiments have been provided in the present disclosure, it should be understood that the disclosed systems and methods may be embodied in many other specific forms without departing from the spirit or scope of the present disclosure. The embodiments and present examples are to be considered as illustrative and not restrictive, and the intention is not to be limited to the details given herein. Many variations and modifications of the invention disclosed herein are possible and are within the scope of the invention. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A ferrate-based water treatment system comprising:
    a ferric compound solution preparation system configured to prepare ferric compound solution;
    an acidic oxidant solution preparation system configured to prepare an acidic oxidant solution;
    a flocculant-adsorbent solution preparation system configured to prepare a flocculant-adsorbent solution;
    a buffer tank fluidly coupled to the ferric compound solution preparation system and to the acidic oxidant solution preparation system;
    a redox reactor fluidly coupled to the ferric compound solution preparation system and to the acidic oxidant solution preparation system and to the flocculant-adsorbent solution preparation system;
    a clarifier fluidly coupled to the redox reactor, to the ferric compound solution preparation system, and to the acidic oxidant solution preparation system; and
    a two-stage filtration system coupled to the clarifier,
    wherein the redox reactor has a first section fluidly coupled with a second section;
        wherein the first section is configured to i) receive contaminated water, the ferric compound solution, and the acidic oxidant solution, ii) mix the ferric compound solution and the acidic oxidant solution to form a first amount of ferrate, and iii) contact the first amount of ferrate with the contaminated water for reaction with contaminants to produce a reacted water, and
        wherein the second section is configured to i) receive the reacted water from the first section, ii) receive the flocculant-adsorbent solution, iii) mix the reacted water and the flocculant-adsorbent solution to produce a reaction mixture, iv) allow for further ferrate reaction with contaminants to form larger particulate contaminants, v) allow for flocculation and adsorption of particulate contaminants into flocs, and vi) produce a redox water,
    wherein the clarifier has a main compartment fluidly coupled with a clarified water chamber,
    wherein the main compartment is configured to i) receive the redox water, the ferric compound solution, and the acidic oxidant solution, ii) mix the ferric compound solution and the acidic oxidant solution to form a second amount of ferrate, iii) contact the second amount of ferrate with the redox water for reaction with unreacted contaminants in the redox water, and iv) allow particulate contaminants and flocs to settle to a conical-shaped bottom portion of the clarifier, and
    wherein the clarified water chamber is configured to receive clarified water from the main compartment.

2. The system of claim 1, wherein the two-stage filtration system comprises a first stage and a second stage, wherein an effluent of the first stage is received by the second stage.

3. The system of claim 2, wherein the first stage comprises one or more advanced catalytic media filters.

4. The system of claim 2, wherein the second stage comprises one or more catalytic carbon filters.

5. The system of claim 2, further comprising:
    a dirty backwash water sump fluidly coupled to i) a clarified water stream that fluidly connects the clarifier to the first stage of the two-stage filtration system, ii) a first filtered water stream that fluidly connects the first stage to the second stage, and iii) to the flocculant-adsorbent solution preparation system.

6. The system of claim 1, further comprising:
    a pre-treatment system fluidly coupled to the redox reactor, wherein the redox reactor is configured to receive contaminated water from the pre-treatment system, wherein the buffer tank of the pre-treatment system is fluidly coupled to the ferric compound solution preparation system and to the acidic oxidant solution preparation system; and
    a sludge handling system fluidly coupled to a conical-shaped bottom portion of the clarifier and to the flocculant-adsorbent solution preparation system.

* * * * *